(12) United States Patent
Wu

(10) Patent No.: US 9,180,576 B2
(45) Date of Patent: Nov. 10, 2015

(54) HOSE CLAMP PLIERS

(71) Applicant: Ming-Chieh Wu, Taichung (TW)

(72) Inventor: Ming-Chieh Wu, Taichung (TW)

( * ) Notice: Subject to any disclaimer, the term of this patent is extended or adjusted under 35 U.S.C. 154(b) by 394 days.

(21) Appl. No.: 13/868,268

(22) Filed: Apr. 23, 2013

(65) Prior Publication Data

US 2013/0228046 A1  Sep. 5, 2013

Related U.S. Application Data

(63) Continuation-in-part of application No. 12/687,852, filed on Jan. 14, 2010, now abandoned.

(51) Int. Cl.
*B25B 7/02* (2006.01)
*B25B 7/12* (2006.01)
*B25B 25/00* (2006.01)
*F16L 33/03* (2006.01)

(52) U.S. Cl.
CPC . *B25B 7/02* (2013.01); *B25B 7/123* (2013.01); *B25B 25/005* (2013.01); *F16L 33/03* (2013.01)

(58) Field of Classification Search
CPC ........ B25B 25/005; B25B 7/02; B25B 27/10; B25B 7/12; B25B 7/18; B25B 7/123; F16L 33/03
See application file for complete search history.

(56) References Cited

U.S. PATENT DOCUMENTS

| | | | | |
|---|---|---|---|---|
| 5,507,206 | A * | 4/1996 | Solski | 81/9.3 |
| 5,865,072 | A * | 2/1999 | Jerdee | 81/9.3 |
| 2010/0058895 | A1 * | 3/2010 | Wu | 81/9.3 |
| 2010/0107823 | A1 * | 5/2010 | Wu | 81/9.3 |

* cited by examiner

*Primary Examiner* — Robert Scruggs
(74) *Attorney, Agent, or Firm* — Patent Office of Bang Shia

(57) ABSTRACT

A pair of hose clamp pliers for clamping a hose is provided with two clamping plates. The pliers include two clamping ends capable of moving toward or away from each other. The two clamping plates are fixedly connected to the two clamping ends and provided with movement guide protrusions and movement stop protrusions. With the protrusions formed along the periphery of the two clamping plates and the gaps defined by the protrusions, the hose clamp pliers can clamp the hose clamp in different directions, so that it can be adapted to different work requirements or environments, for example, in a narrow space. Further, the movement guide protrusions and movement stop protrusions restrict the hose clamp in two different directions, so as to improve clamping stability.

4 Claims, 8 Drawing Sheets

HOSE CLAMP PLIERS

This application is a continuation in part of U.S. patent application Ser. No. 12/687,852, which claims the benefit of the earlier filing date of Jan. 14, 2010. Claims 1 and 4 of this application are revised from the previous claims 1 and 4 of the U.S. patent application Ser. No. 12/687,852, respectively. Claims 2 and 3 of this application are the same as the previous claims 1 and 4 of the U.S. patent application Ser. No. 12/687,852.

BACKGROUND OF THE INVENTION

1. Field of the Invention

The present invention relates to a pair of pliers, and more particularly to a pair of hose clamp pliers used in combination with a hose clamp.

2. Description of the Prior Art

Conventionally, slim pipes, such as water hoses are often connected in such a way that the big-diameter pipe is forced onto the small-diameter pipe, and then a hose clamp is used to increase tight connection between the two pipes.

Referring to FIG. 1, which shows a pair of hose clamp pliers 10 disclosed in US 2008/041831, the hose clamp pliers 10 are used to clamp a kind of clamp 11 which is made of an iron plate bent into a ring-shape, and the clamp 11 has two protruding ends 111 to be clamped by two clamping plates 12 of the pliers 10. However, the pliers 10 only use the clamping plates 12 to claim the ends 111 of the clamp 11 but don't have any other positioning or restricting structures to maintain the clamping force. Therefore, the clamp 11 is likely to slip off the pliers 10 when being clamped.

Another conventional hose clamp pliers 20 is shown in FIGS. 2-5, wherein each of the clamping plates 21 of the hose clamp pliers 20 is provided with a plurality of protrusions 211 which are arranged in a matrix manner to define a plurality of longitudinal gaps S1 and radial gaps S2, which allow the ears 221 of a hose clamp 22 to be inserted into the hose clamp pliers 20 in different directions with respect to the clamping plates 21. The directions that the ears 221 are inserted in the longitudinal gaps S1 and radial gaps S2 are considered as the movement directions of the hose clamp 22. The protrusions 211 on the clamping plates 21 of the hose clamp pliers 20 are unable to stop the movement of the hose clamp 22 in the movement directions, namely, the hose clamp 22 is free to move in the movement directions and will stop only when the annular body of the hose clamp 22 is stopped against the edge of the clamping plates 21, which makes it difficult for the hose clamp pliers 20 to hold the hose clamp 22 stably when clamping.

The present invention has arisen to mitigate and/or obviate the afore-described disadvantages.

SUMMARY OF THE INVENTION

The present invention relates to a pair of hose clamp pliers which is capable of overcoming the disadvantage of the conventional hose clamp pliers that the hose clamp cannot be positioned stably when being clamped.

To achieve the above objective, a pair of hose clamp pliers in accordance with the present invention is used to clamp a hose clamp which comprises two first ears at one end and two second ears at another end thereof, and an end of each of the first and second ears is arc-shaped. The pair of hose clamp pliers comprises: a pivoting body, a clamping head, a control body, an adjustment rod, a spring, and two clamping plates. The pivoting body is pivoted to the clamping head, and the clamping head is pivoted to one end of the adjustment rod.

The two clamping plates are respectively fixedly connected to the pivoting body and the clamping head, each of the clamping plates includes an inner surface, an outer surface, two opposite lateral surfaces, a free end surface and a connecting end surface opposite the free end surface. The two opposite lateral surfaces are located at both sides of the inner and outer surfaces of each of the clamping plates, the two clamping ends of the hose clamp pliers are fixed to the outer surfaces of the two clamping plates, and the two inner surfaces of the two clamping plates are opposite each other, each of the connecting end surfaces is located between the two lateral surfaces and connected to the clamping head and the pivoting body, respectively. Each of the free end surfaces is located between the two lateral surfaces of each of the clamping plates. On an inner surface of each of the clamping plates is formed a plurality of protrusions which include a plurality of movement guide protrusions and a plurality of movement stop protrusions, the movement guide protrusions are arranged along the two opposite lateral surfaces and the free end surface and each are a square structure with four straight guide edges. Each two neighboring movement guide protrusions defines a movement path.

Each of the movement stop protrusions is located in an area defined by the two lateral surfaces, the free end surface and the connecting end surface of each of the clamping plates and includes an arc-shaped concave edge which is located at an end of the movement path. The first and second ears of the hose clamp are able to insert into the movement path from the free end of the two clamping plates or from the two opposite lateral surfaces in such a manner that the first and second ears are stopped against the arc-shaped concave edge and restricted in the movement path.

With the protrusions formed along the periphery of the two clamping plates and the gaps defined by the protrusions, the hose clamp pliers can clamp the hose clamp in different directions, so that it can be adapted to different work requirements or environments, for example, in a narrow space.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
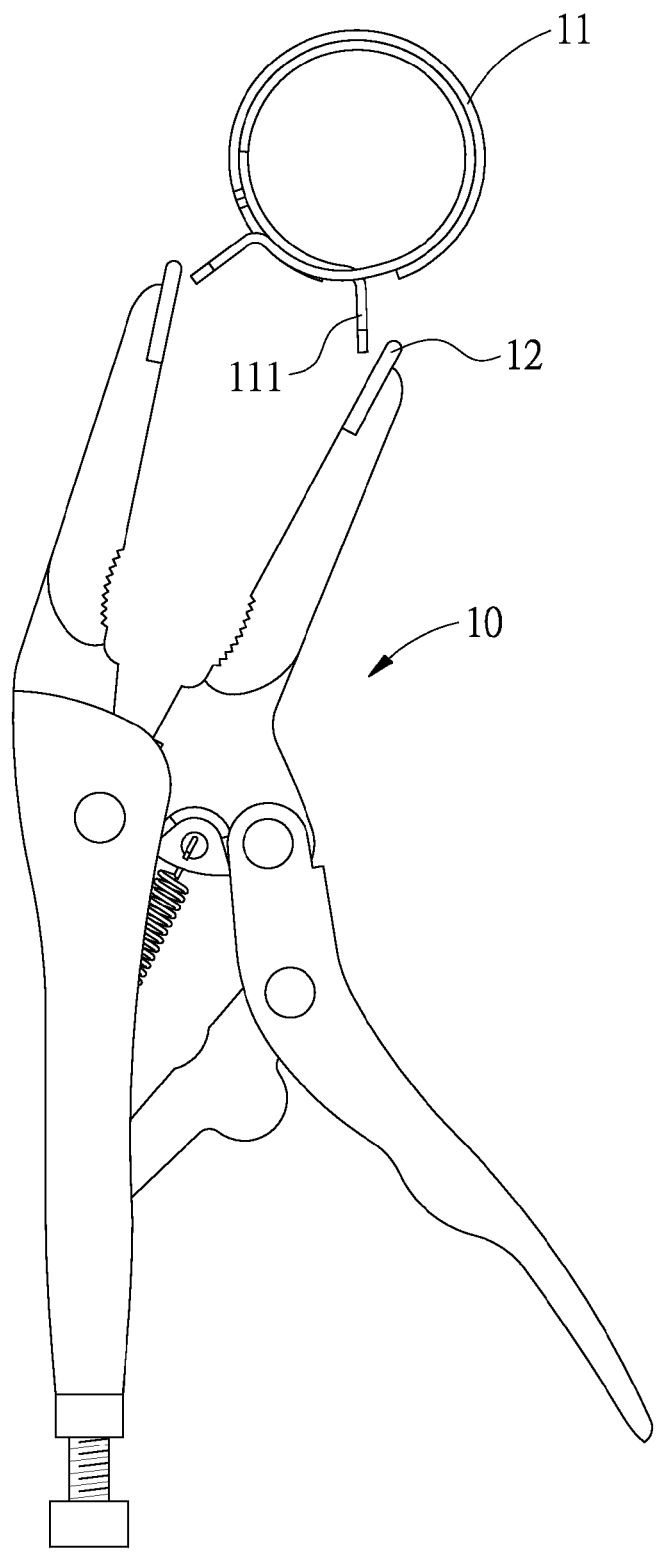
FIG. 1 is a plan view of a conventional hose clamp pliers.
Figure 2:
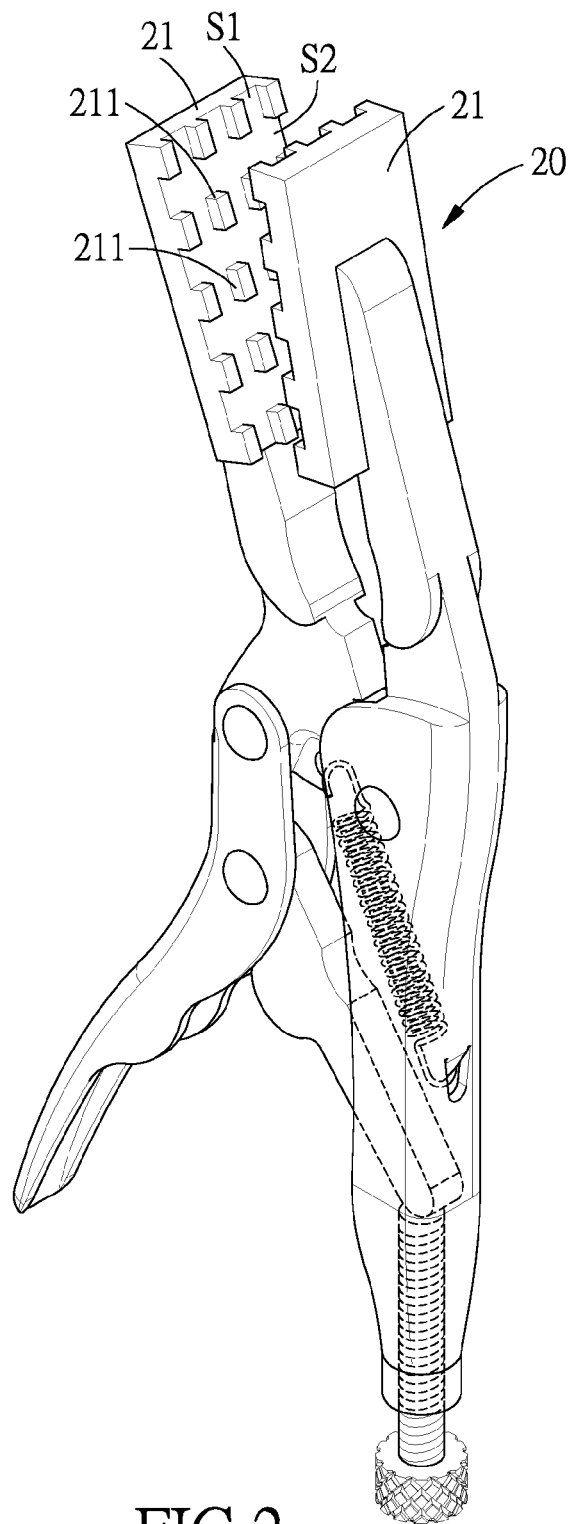
FIG. 2 is a perspective view of another conventional hose clamp pliers.
Figure 3:
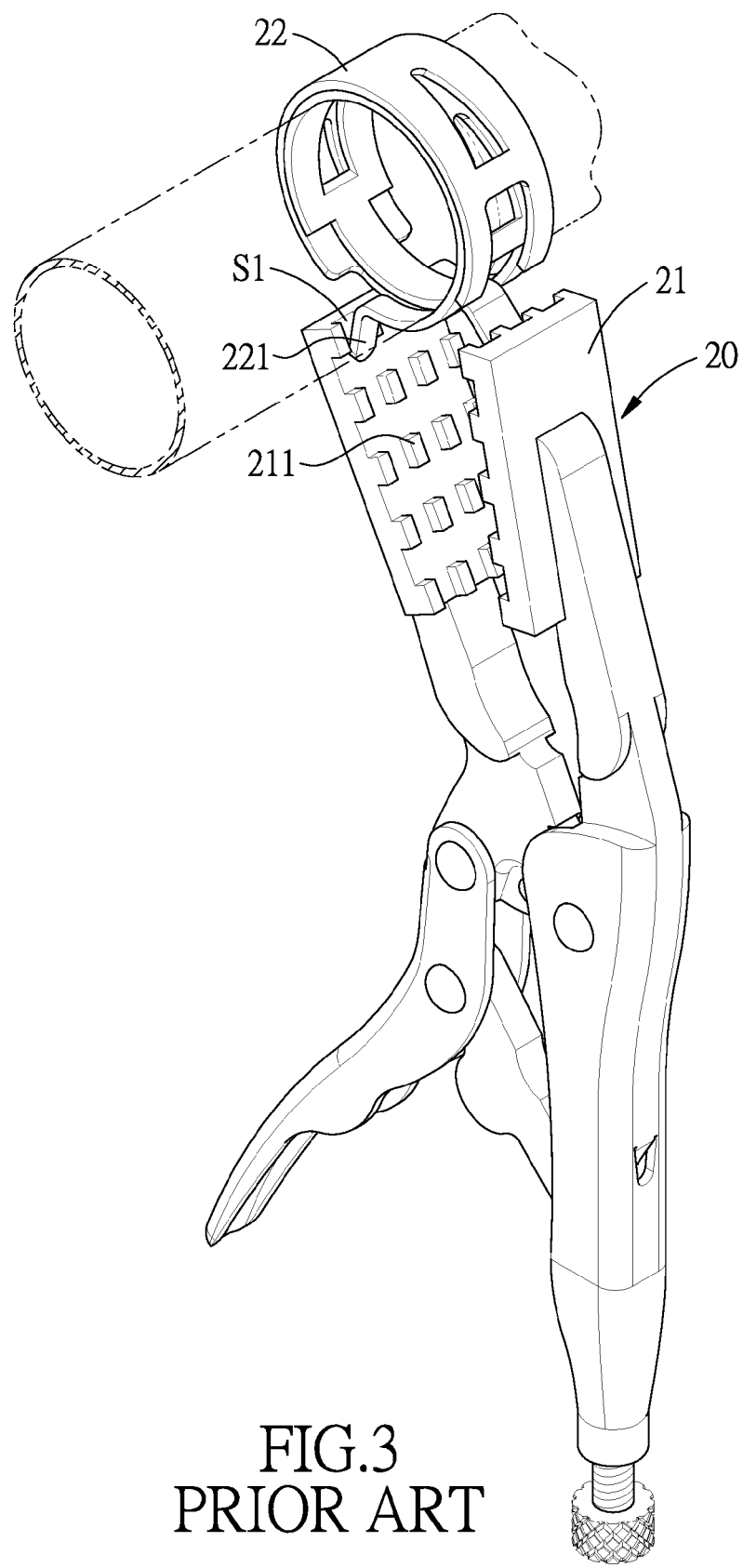
FIG. 3 is an operational perspective view of the conventional hose clamp pliers.
Figure 4:
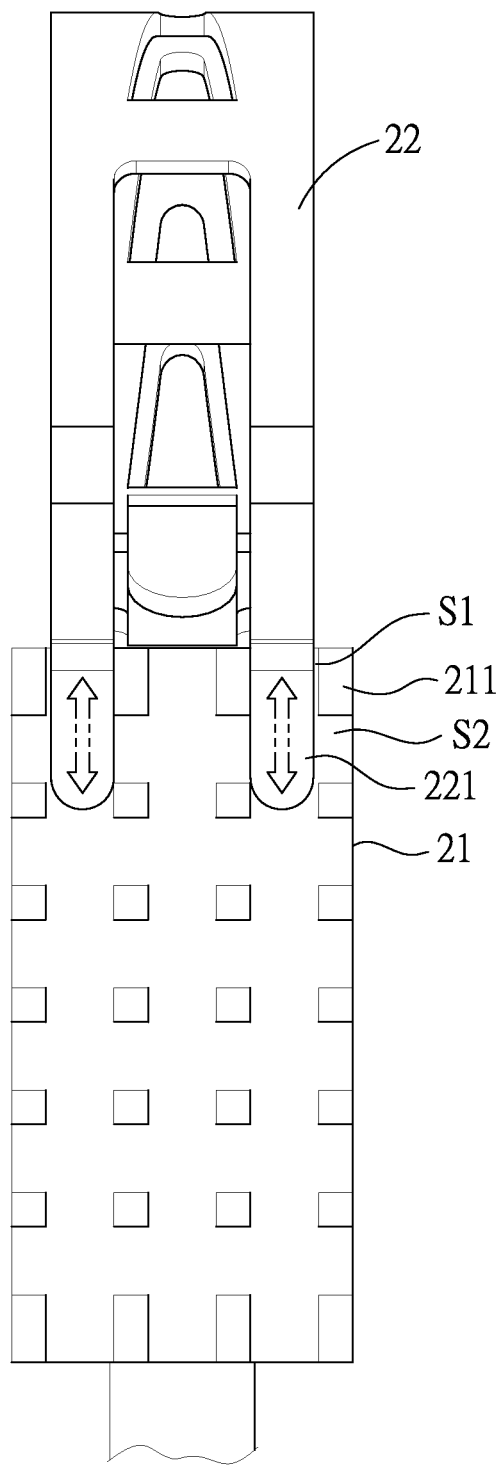
FIG. 4 is an operational plan view of the conventional hose clamp pliers.
Figure 5:
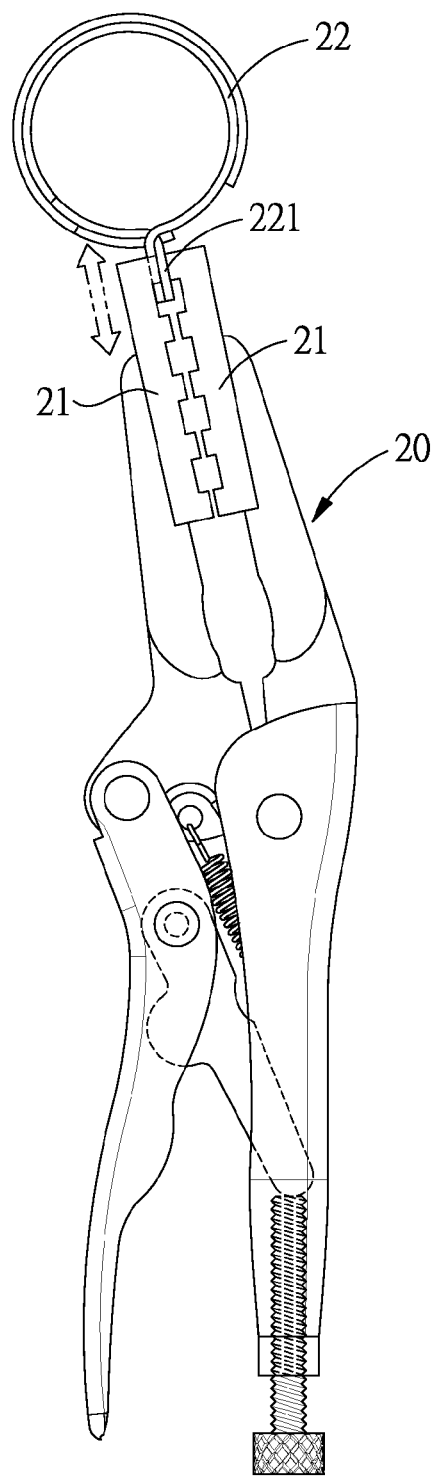
FIG. 5 is an operational side view of the conventional hose clamp pliers.
Figure 6:
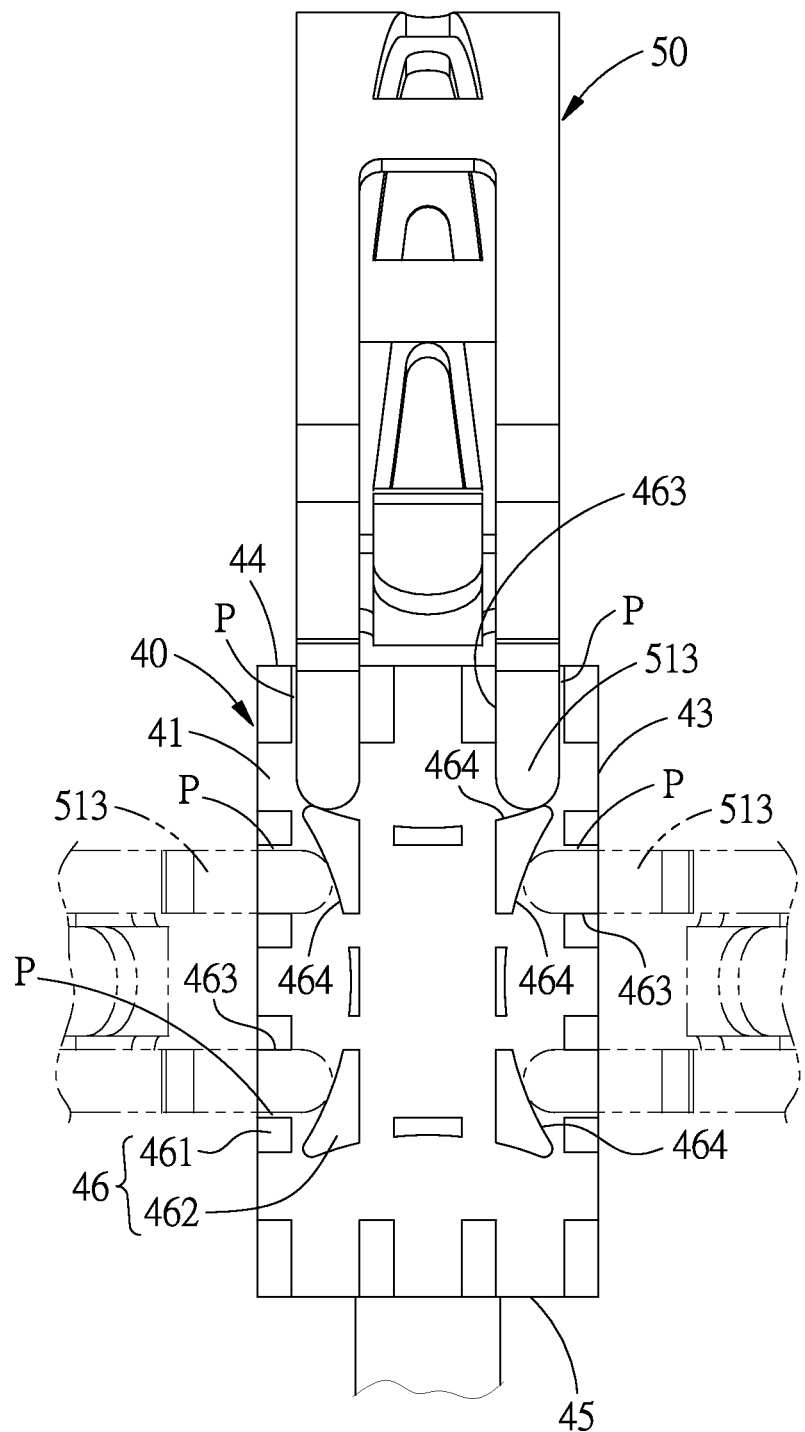
FIG. 6 is an operational plan view of a pair of hose clamp pliers which is capable of clamping the hose in three different directions in accordance with the present invention.
Figure 7:
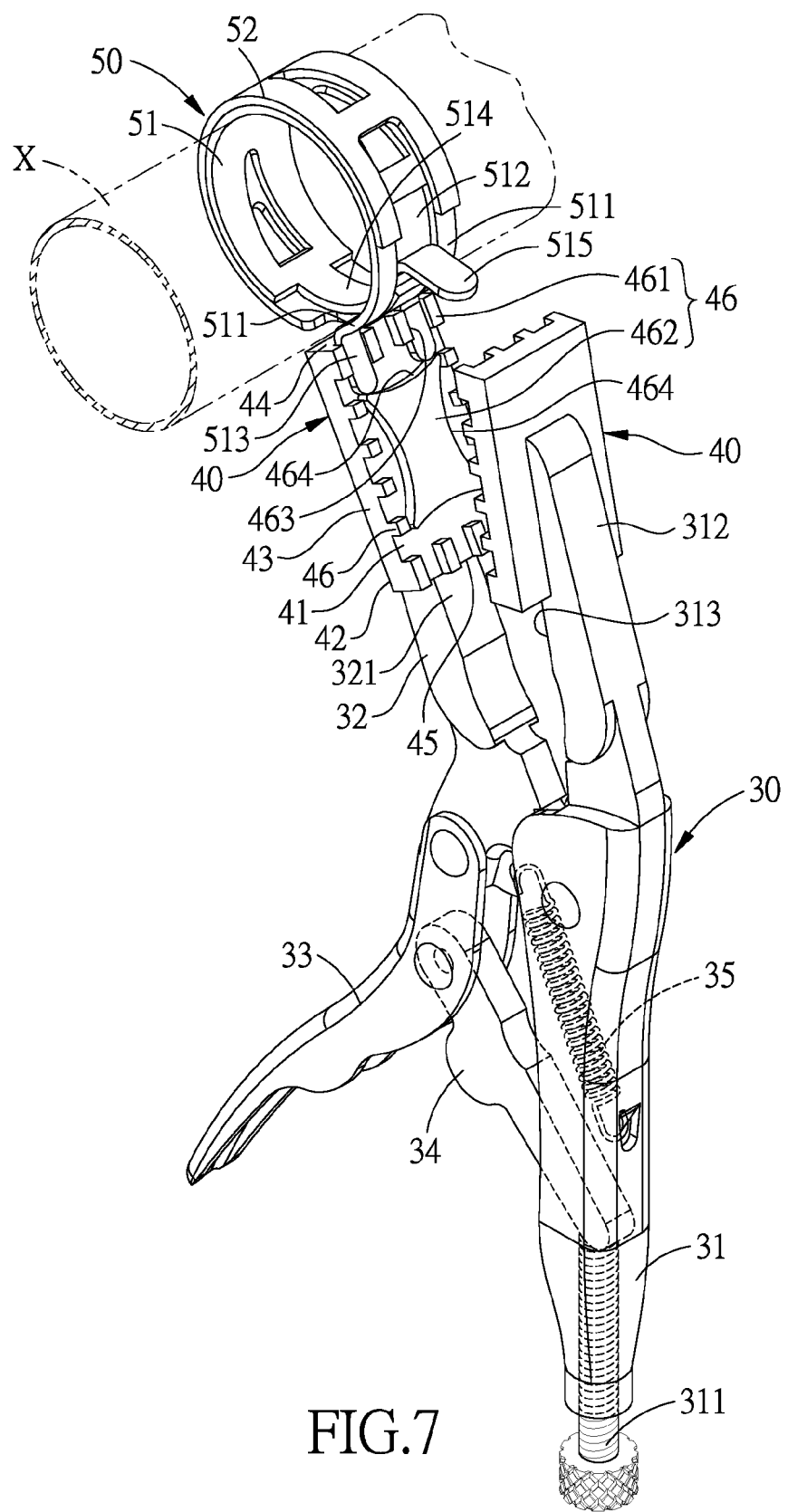
FIG. 7 is an operational perspective view of a pair of hose clamp pliers which is capable of clamping the hose in three different directions in accordance with another embodiment of the present invention.
Figure 8:
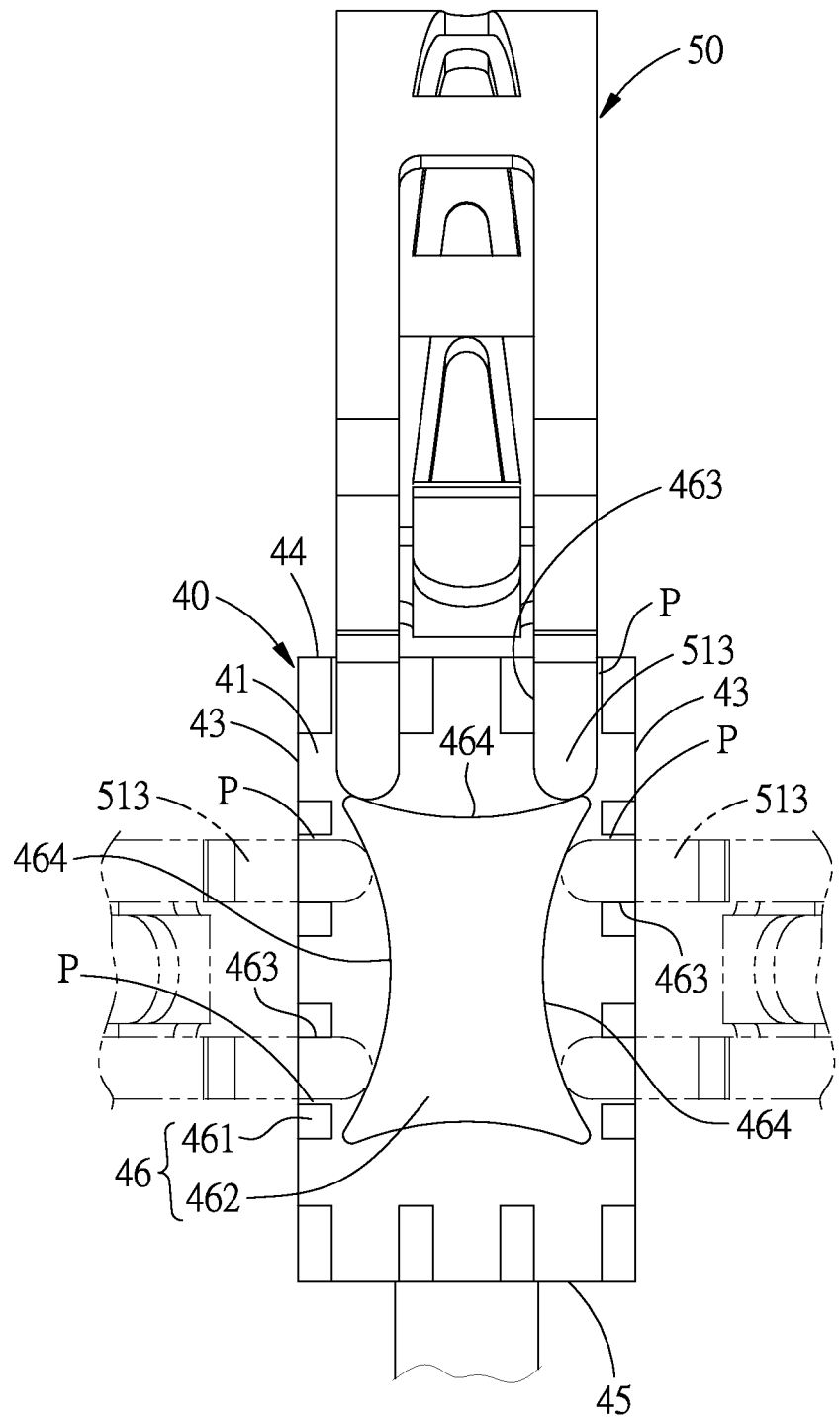
FIG. 8 is an operational plan view of a pair of hose clamp pliers which is capable of clamping the hose in three different directions in accordance with another embodiment of the present invention.

Referring to FIGS. 6-8, a pair of hose clamp pliers 30 in accordance with a preferred embodiment of the present invention comprises: a pivoting body 31, a clamping head 32, a control body 33, an adjustment rod 34, a spring 35 and two clamping plates 40. The pivoting body 31 has one end provided with a screw 311 and the other end fixed to the clamping head 32. The pivoting body 31 is pivoted to the clamping head 32. The pivoting body 31 and the clamping head 32 are each formed with a clamping end 313, 321, and the two clamping ends 313 and 321 are opposite to each other. The clamping head 32 is pivoted to one end of the control body 33, and the control body 33 is pivoted to one end of the adjustment rod 34. The other end of the adjustment rod 34 abuts against the screw 311 of the pivoting body 31. Two ends of the spring 35 are connected to the pivoting body 31 and the clamping head 32, respectively, so as to control the control body 33 to pivot relative to the adjustment rod 34. Meanwhile, the control body 33 drives the clamping head 32 to pivot relative to the pivoting body 31, and then the pivoting motion of the clamping head 32 causes expansion and compression of the spring 35.

The two clamping plates 40 are respectively fixedly connected to the clamping ends 313, 321 of the clamping head 32 and the clamping end 312 of the hose clamp pliers 30 and located opposite each other. When the clamping head 32 pivots relative to the pivoting body 31, the relative position of the two clamping ends 313, 321 can be controlled to make the two clamping plates 40 approach each other to perform a clamping action. Each of the clamping plates 40 includes an inner surface 41, an outer surface 42, two opposite lateral surfaces 43, a free end surface 44 and a connecting end surface 45 opposite the free end surface 44. The two lateral surfaces 43 are located at both sides of the inner and outer surfaces 41, 42. The clamping ends 313, 321 of the hose clamp pliers 30 are fixed to the outer surfaces 42 of the two clamping plates 40, and the two inner surfaces 41 of the two clamping plates 40 are opposite each other. Each of the connecting end surfaces 45 is located between the two lateral surfaces 43 and connected to the clamping head 32 and the pivoting body 31, respectively. Each of the free end surfaces 44 is located between the two lateral surfaces 43. On the inner surface 41 of the each of the clamping plates 40 are formed a plurality of protrusions 46 which include a plurality of movement guide protrusions 461 and a plurality of movement stop protrusions 462. The movement guide protrusions 461 are arranged along the two opposite lateral surfaces 43 and the free end surface 44 and each are a square structure with four straight guide edges 463. Each two neighboring movement guide protrusions 461 defines a movement path P therebetween.

Each of the movement stop protrusions 462 is located in an area defined by the two lateral surfaces 43, the free end surface 44 and the connecting end surface 45 of each of the clamping plates 40 and includes an arc-shaped concave edge 464 which is located at the end of the movement path P. As shown in FIG. 6, there is a plurality of the movement stop protrusions 462, and the arc-shaped concave edges 464 of the movement stop protrusions 462 are located at the ends of the movement paths P and can be connected to form a continuous arc. For example, as shown in FIG. 6, the movement stop protrusions 462 each has two arc-shaped concave edges 464 located at the ends of the movement paths P in the free end surface 44 and the connecting end surface 45, respectively. As shown in FIGS. 7 and 8, there can also be only one movement stop protrusion 462 on each of the clamping plates 40, and the movement stop protrusion 462 has a plurality of arc-shaped concave edges 464 which are located at the ends of the movement paths P both in the free end surface 44 and the connecting end surface 45, respectively.

The pair of hose clamp pliers 30 in accordance with the present invention is used to clamp a hose clamp 50 which comprises an inner ring portion 51 and an outer ring portion 52. The inner ring portion 51 is formed by bending an elongated plate into a ring shape. One end of the inner ring portion 51 is bifurcated to form two first protruding portions 511 and a gap 512 therebetween, and each of the first protruding portions 511 is bent to form a first ear 513. The other end of the inner ring portion 51 is provided with a second protruding portion 514 which is bent to form a second ear 515. The ends of the first and second ears 513, 515 are arc-shaped. The outer ring portion 52 is also formed by bending an elongated plate into a ring shape. The outer ring portion 52 is mounted outside the inner ring portion 51.

When the hose clamp 50 is clamped by the clamping plates 40 of the hose clamp pliers 30, as shown in FIGS. 6 and 8, the two first ears 513 are received in the two movement paths P of one of the clamping plates 40 and stopped against the arc-shaped concave edge 464 in such a manner that the first ears 513 are abutted against the straight guide edges 463 of the movement guide protrusions 461 and the arc-shaped concave edge 464 of the movement stop protrusions 462. By such arrangements, clamping stability is improved due to the fact that the first ears 513 are restricted in three different directions.

The second ears 515 are received in the movement paths P of another one of the clamping plates 40 and also restricted in different directions by the straight guide edges 463 and the arc-shaped concave edge 464.

When clamping the hose clamp 50, the hose clamp pliers 30 can fix the clamping head 32 and the pivoting body 31 to make the two clamping ends 313, 321 keep clamping the hose clamp 50, so that the user can use the hose clamp pliers 30 to keep clamping the hose clamp 50 hold by the two clamping plates 40 without exerting a continuous force. During the clamping operation, the two first ears 513 are received in the areas between the straight guide edges 463 of the movement guide protrusions 461 and the arc-shaped concave edge 464 of the movement stop protrusions 462, hence, the two straight guide edges 463 and the arc-shaped concave edge 464 can fix the two first protruding portions 511 in two different directions, producing a stable clamping effect.

When in use, the hose clamp 50 is sleeved onto a hose X, and the free end surfaces 44 of the clamping plates 40 are placed perpendicular to the lengthwise direction of the hose X, as shown in FIG. 7, at this moment, the user can press the control body 33 toward the pivoting body 31 to make the two clamping plates 40 approach each other to carry out clamping operation, so as to reduce the distance between the first and second protruding portions 511, 514 while increasing the inner diameter of the inner ring portion 51, so that the hose clamp 50 can be mounted on the hose, and then the user can release the hose clamp pliers 30, the outer ring portion 52 of the hose clamp 50 will be clamped tightly against the inner ring portion 51, which leads to an increase of the distance between the first and second protruding portions 511, 514 and the reduction of the inner diameter of the inner ring portion 51, so that the hose clamp 50 will be clamped tightly against the hose. Furthermore, adjusting the depth at which the screw 311 is screwed in the pivoting body 31 can drive the adjustment rod 34 to move, and then the adjustment rod 34 will move the control body 33 and the clamping head 32, so that the relative position of the clamping end 321 of the clamping head 32 and the clamping end 313 of the pivoting body 31 can be adjusted, thus controlling the distance between the clamping plates 40 fixed on the two clamping ends 313, 321 for adjusting the size of the clamped hose clamp 50.

Referring finally to FIGS. 6 and 8, except the connecting end surfaces 45, the hose clamp pliers 30 can use the two opposite lateral surfaces 43, the free end surface 44 of the two clamping plates 40 to clamp the hose clamp 50, that is to say that the hose clamp pliers 30 can clamp in different directions, so that it can be adapted to different work requirements or environments, for example, in a narrow space.

While we have shown and described various embodiments in accordance with the present invention, it is clear to those skilled in the art that further embodiments may be made without departing from the scope of the present invention.

What is claimed is:

1. A pair of hose clamp pliers for clamping a hose clamp, the hose clamp comprising two first ears at one end and two second ears at another end thereof, an end of each of the first and second ears being arc-shaped, the pair of hose clamp pliers comprising:

a pivoting body, a clamping head, and a control body, the pivoting body being pivoted to the clamping head, and the clamping head being pivoted to one end of an adjustment rod;

two clamping plates being respectively fixedly connected to the pivoting body and the clamping head, each of the clamping plates including an inner surface, an outer surface, two opposite lateral surfaces, a free end surface and a connecting end surface opposite the free end surface, the two opposite lateral surfaces being located at both sides of the inner and outer surfaces of each of the clamping plates, the two clamping ends of the hose clamp pliers being fixed to the outer surfaces of the two clamping plates, and the two inner surfaces of the two clamping plates being opposite each other, each of the connecting end surfaces being located between the two lateral surfaces and connected to the clamping head and the pivoting body, respectively, each of the free end surfaces being located between the two lateral surfaces of each of the clamping plates, on an inner surface of each of the clamping plates being formed a plurality of protrusions which include a plurality of movement guide protrusions and a plurality of movement stop protrusions, the movement guide protrusions being arranged along the two opposite lateral surfaces and the free end surface and each being a square structure with four straight guide edges, each two neighboring movement guide protrusions defining a movement path; and each of the movement stop protrusions being located in an area defined by the two lateral surfaces, the free end surface and the connecting end surface of each of the clamping plates and including an arc-shaped concave edge which is located at an end of the movement path, the first and second ears of the hose clamp being able to insert into the movement path from the free end of the two clamping plates or from the two opposite lateral surfaces in such a manner that the first and second ears are stopped against the arc-shaped concave edge and restricted in the movement path.

2. The pair of hose clamp pliers for clamping the hose clamp as claimed in claim 1, wherein the hose clamp including an inner ring portion and an outer ring portion, the inner ring portion being formed by bending an elongated plate into a ring shape, one end of the inner ring portion being bifurcated to form two first protruding portions and a gap therebetween, and each of the first protruding portions being bent to form the first ear, another end of the inner ring portion being provided with a second protruding portion which is bent to form the second ear, the second protruding portion being received in the gap between the two first protruding portions, the outer ring portion being formed by bending an elongated plate into a ring shape, the outer ring portion being mounted outside the inner ring portion.

3. The pair of hose clamp pliers for clamping the hose clamp as claimed in claim 1 further comprising an adjustment rod and a spring, the pivoting body has one end provided with a screw and another end fixed to the clamping head and is pivoted to the clamping head, the pivoting body and the clamping head each have a clamping end, the clamping head is pivoted to one end of the control body, and the control body being pivoted to one end of the adjustment rod, another end of the adjustment rod abutting against the screw of the pivoting body, two ends of the spring being connected to the pivoting body and the clamping head, respectively.

4. The pair of hose clamp pliers for clamping the hose clamp as claimed in claim 3, wherein two clamping plates are respectively fixedly connected to the clamping ends of the clamping head and the clamping end of the pivoting body and the clamping head.

* * * * *